P. KRAMER.
Felley-Plates for Vehicle-Wheels.

No. 150,421.

Patented May 5, 1874.

WITNESSES
E. H. Bates
Wm. E. Chaffee

INVENTOR,
Philip Kramer
By J. C. Lathrop his ATTORNEY.

UNITED STATES PATENT OFFICE.

PHILIP KRAMER, OF HILLSBOROUGH, OHIO.

IMPROVEMENT IN FELLY-PLATES FOR VEHICLE-WHEELS.

Specification forming part of Letters Patent No. 150,421, dated May 5, 1874; application filed April 21, 1874.

*To all whom it may concern:*

Be it known that I, PHILIP KRAMER, of Hillsborough, Ohio, have invented certain Improvements in Felly-Joints, of which the following is a specification:

My invention relates to an improved mode of fastening the joints where the ends of the fellies of wheeled vehicles come together; and consists in certain devices, hereinafter described, whereby the ends of the fellies are securely held together, the possibility of loosening, jogging, or wabbling prevented, and the tire covering the joint is more securely held over the ends in consequence of the bolts, or other equivalent fastenings, being attached on the inside of the periphery of the wheel to an iron plate, more fully hereinafter described.

Figure 1:
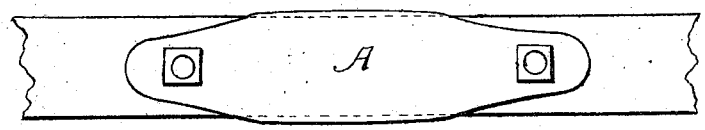
Figure 2:
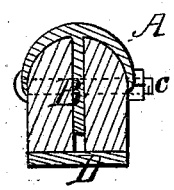
Figure 3:
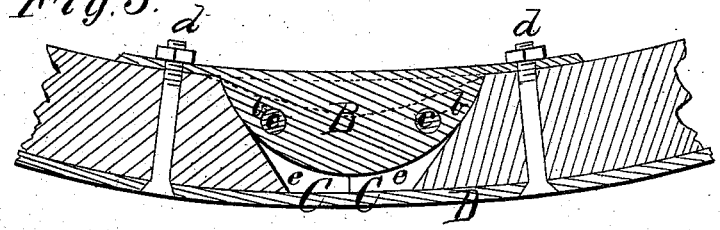
Figure 4:
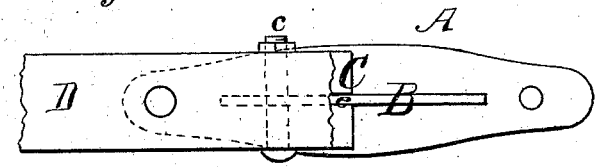

Reference being had to the accompanying drawings, and letters of reference marked thereon, Figure 1 is a top view. Fig. 2 is a cross-section of the same. Fig. 3 is a vertical section. Fig. 4 is a bottom view of the same.

A designates a plate of any preferred metal, preferably about three inches long, of the shape shown in the drawings annexed. Any shape or size, however, that will answer the purpose sought to be gained may be used at will. This plate A is made semicircular from side to side, so as to overlap the sides of the fellies, and to prevent either of them from slipping to one side. Running lengthwise on the inside of this semicircle-plate A is a dowel, B, preferably about two-thirds of the length of the plate, at right angles to the tire, and running nearly through the fellies in a mortise, e, cut in each end thereof. This dowel is rigidly attached to the plate A, and is provided with two or more holes, b, through which bolts or rivets c pass. One or more of these bolts or rivets pass through each end of each felly, laterally, and thus afford another efficient means for preventing the ends of the fellies from slipping past each other, or for preventing the felly from splitting at the joint. C C are the ends of the fellies in close contact, provided with the mortise e, for the reception of the dowel B, so that each end will receive an equal share of the dowel. These fellies C C are further provided with holes to correspond with those in the dowel, for the reception of the bolts or rivets c, running laterally through them, and also with two or more holes running at right angles thereto, for the reception of bolts or rivets d, which pass from the tire D and enter plate A, and fastened securely by nuts, as shown in Fig. 3.

It will be clearly observed that in the construction and arrangement of my device I secure the following advantages: The overlapping sides of the plate A and dowel B prevent the ends of the fellies from getting out of place. The bolts c prevent the fellies from slipping past each other, and also prevent the fellies from splitting, in which they are assisted by the overlapping sides of plate A, as shown and described. The bolts d give an additional firmness to the tire D over the joint of the felly C, it being securely fastened to the metal plate A on the inside of the periphery of the wheel.

It will be readily seen that the within device can be applied to wheels heretofore manufactured with but little expense and labor.

I am aware that a patent has been granted to Baldwin and Everett, bearing date October 8, 1872, No. 132,065, for a mode of fastening the tires and fellies together by means of swells and bolts embedded in the wood. This I do not claim; but What I do claim is—

1. The plate A, provided with a dowel, B, in combination with the fellies C C and fastening devices c d, as shown and described.

2. The combination of semicircular plate A, dowel B, tire D, felly C, and fastening devices c d, substantially as shown and specified.

In testimony that I claim the foregoing I have hereunto set my hand this 13th day of September, 1873.

PHILIP KRAMER.

Witnesses:
W. W. WADDELL,
H. L. MEEK.